UNITED STATES PATENT OFFICE.

ROBERT A. MARR, OF NORFOLK, VIRGINIA.

PROCESS OF RECOVERING USED PAPER.

1,396,227.     Specification of Letters Patent.     Patented Nov. 8, 1921.

No Drawing.     Application filed June 11, 1920. Serial No. 388,359.

*To all whom it may concern:*

Be it known that I, ROBERT A. MARR, a citizen of the United States of America, residing at Norfolk, in the county of Norfolk and State of Virginia, have invented certain new and useful Improvements in Processes of Recovering Used Paper, of which the following is a specification.

The present invention relates to the production of utilizable pulp or paper from old paper, which may be printed paper, waste paper stock, office waste paper, miscellaneous waste paper, and the object of the invention is to recover substantially the entire quantity of stock in a highly purified condition and in an economical manner.

In carrying out the process of the present invention, I preferably proceed as follows:

The paper stock to be treated is first torn or cut into pieces of appropriate size, depending upon the size of the beater engine to be employed in the process. The sizes of the pieces of paper can vary a good deal, say between ten and thirty square inches.

To the stock is then added an aqueous liquid, the amount of liquid being preferably about two and one-half gallons for each pound of paper stock. More liquid than this can be added if desired, but the amount stated is ordinarily sufficient. This liquid contains soap, preferably soft soap (soap of potash base) and ammonia. The proportions of these materials may vary more or less, but for 16,000 pounds of paper of ordinary grades, about 180 pounds of soft soap (dry basis) and about 18 pounds of ammonia gas ($NH_3$) form a good proportion. 40,000 gallons of water would be a suitable amount to use with this batch of material. (A gallon of water weighs 8 pounds).

The paper stock may be first dumped dry into a tank or vertical boiler, provided at its lower end with a steam coil or preferably with a perforated pipe for introducing steam. The liquid above referred to, containing the soft soap and the ammonia is then added. The liquid is then heated in any convenient manner to about the boiling point, or the liquid may be boiled. Two or more different kinds of paper may, in some cases, be placed in a cage of wire mesh material and this cage then immersed in the liquid. The liquid is maintained at about the boiling point for a short time, say twelve to twenty minutes ordinarily. The injection of steam into the mass is then shut off and the mass allowed to stand for a few minutes, when a considerable quantity of oleaginous matter in a liquid state, containing ink pigment and containing more or less of the loading or filling material of the paper stock rises to the surface and may be skimmed off. The mass is then run direct while boiling hot, into a beater engine, in which the rotary beater is raised to a simple brush beneath the rolls and the mass run through the beater for a short time, say two or three minutes in order to reduce the mass to a coarse pulp. The roll is then run down to its ordinary working position and a number of baffles are placed in position in the upper portions of the beater engine, these baffles preferably being placed at an angle of about 30° to the vertical, and sloping in the direction opposite to the flow of the liquid so as to cause eddies or quiet places where the oleaginous matter and ink conglomerates and black specks, which continue to separate from the pulp, may collect. This oleaginous matter carrying the bulk of the ink pigment and also carrying the bulk of the sizing and loading and filling material of the paper is caught by these baffles, which are inclined 15 to 30° to the direction of flow of the pulp, and the so separated matter is suitably removed, either by skimming or by drawing off through notches or openings in the rim of the beater, or otherwise. The operation of the beater is continued as long as oleaginous matter, etc., continues to separate, which will ordinarily be about 15 to 25 minutes, by the end of which time substantially all of the oleaginous matter and agglomerated dark specks will have separated from the pulp. The number of baffles used can be varied, about two to six being a convenient number.

Waste paper sometimes contains small pieces of metal, for example iron wires used for binding magazines or for fastening sheets together to form booklets. These can conveniently be separated by locating magnets in a recess cut in the floor of the beater engine, or by magnets located in the beater engine at appropriate places.

The pulp may then be run to a pulp strainer for separating the pulp from the water or this material may be run direct into the stuff chest of a paper machine, either alone or with an additional quantity of pulp from some other source.

Ordinary waste paper from offices with white and colored papers carrying black and colored inks including printing inks, lithographing inks, writing inks, typewriter inks and the like, treated according to the present process (particularly with the modification described below) produces a pulp from which an excellent grade of paper can be obtained.

Miscellaneous brown paper waste including manila paper and the like, treated according to the present process, produces a relatively light colored pulp, and I find that if 10 or 20% of this pulp is added to 80 to 90% of the pulp from printed white paper waste, a grade of paper somewhat whiter than ordinary news stock and considerably stronger than ordinary news stock can readily be produced. It is to be understood, of course, that a convenient quantity of blue dye can be used to overcome any undesired yellowness of the pulp or paper. Brown paper waste stock with white office waste, mixtures in the proportions of 1 to 3 or 1 to 1, or other proportions, with the proper addition of protein, glue, sizing and the like, give very strong water-resisting papers suitable for making charts, field survey sheets and the like. Colored comic sections of newspapers and rotagravure prints respond as readily as ordinary print paper. These papers are frequently made of high loaded sulfite stock and produce high grade pulp.

The material coming from the beater engine after the separation of the floated oleaginous matter is sufficiently free from pigment for many of the ordinary grades of paper. If it is desired to remove the last traces of ink, a washing with water can be performed before the material goes into the paper machine, or the same can be performed in the pulp strainer.

In a modified form of the process, the material can be removed from the beater engine after being operated upon thereby for a short time, say for five minutes and can be again run into a vertical tank and heated preferably by steam coils for causing separation of oleaginous matter and ink which has been so loosened in the beater that it will readily separate from the pulp. This modification does not, however, ordinarily give so complete a separation as the other modification, previously described.

The scum containing the pigment and oleaginous matter, size, filling etc., can be worked up into any desired end product, such as ink, paint, shoe findings, chip board, etc.

The liquor, after the completion of the operation, is separated from the pulp as above stated. This liquor still contains a suitable quantity of the soft soap and ammonia originally added, and a small additional quantity (perhaps 10 to 30% of the amount initially added) of the soap and ammonia can be added to this old liquor for the treatment of the next run of paper.

In some instances, a number of different kinds of papers can be separately caged in wire mesh containers to prevent mixing during the cooking or boiling operation, after which operation the cages containing the cooked material can be removed from the tank of liquor and the pulp can be worked up in the manner above described, either mixing the several kinds of paper or not, as desired. The liquor remaining after withdrawing the cages of cooked paper, can be at once built up by the addition of a small further quantity of soft soap and ammonia, for the treatment of a following batch of used paper.

In the above description I have referred to the use of soft soap as being the preferred material to employ. I have also found that hard soap may be used, although the results are not ordinarily as good as those produced when soft soap is employed, the hard soap does not seem to remove the ink so readily or completely or quickly.

News print inks, book inks and the like consist essentially of carbon in suspension in oily vehicles.

Writing inks and certain kinds of lithographic and electrotyping ink contain dyes in solution, either with or without carbon or other insoluble pigment in suspension.

For those inks which contain matter in solution, especially for ordinary office writing inks, a small quantity of oxalic acid is added to the solution, preferably at the commencement of the operation. The amount of oxalic acid can vary more or less, one-sixteenth of an ounce to one pound of paper being a moderate quantity, although substantially more than this can be employed if desired.

The ammonia employed in the process seems to be absorbed by the pigment of the ink (the latter consisting largely of lamp black or other forms of free carbon) whereby this latter is buoyed up and caused to come to the surface, where it is trapped by the oleaginous matter. A somewhat similar effect is noted with the filling, loading or sizing material of the paper.

With ordinary print paper, I have repeatedly recovered about 90% of the weight of the original paper in the form of finished white dry pulp.

I claim:

1. A process of recovering used print paper which comprises heating the used print paper with water, soft soap and ammonia to near the boiling point until at least a substantial portion of the oleaginous matter of the ink separates on the surface of the water, removing this separated matter, pulping the mass hot in a beater, until the paper is reduced to a pulp and continuing the operation of the beater until a further substantial part of the oleaginous matter, carrying the ink pigment, separates on the surface of the liquid, and removing such separated matter.

2. In the preparation of pulp from used print paper, the steps of heating to about the boiling point, a mixture of water, soap, ammonia and the used paper, and thereafter beating in a beater engine until reduced to a pulp and continuing the heating until at least the major portion of the ink pigment has risen to the surface, and baffling the flow of selected surface portions of the pulp whereby the scum carrying the ink pigment collects in such baffled portions, and removing such scum.

3. In the preparation of print paper pulp from used paper, the operation of maintaining at near the boiling point for at least five minutes, a mixture comprising such paper, water, soap and ammonia, and then pulping the paper while hot.

4. In the preparation of print paper pulp from used paper, the operation of maintaining at near the boiling point for at least five minutes, a mixture comprising the reaction products of such paper, water, soap, ammonia and oxalic acid, and then pulping the paper while hot.

5. In the preparation of print paper pulp from used paper, the operation of maintaining at near the boiling point for at least five minutes, a mixture comprising, roughly 16,000 parts paper, 320,000 parts water, 180 parts soft soap, 18 parts ammonia, and then pulping the paper while hot.

6. In the preparation of clean pulp from used paper, the steps of heating to boiling, a dilute soap solution and ammonia, with the paper stock, while hot removing a part of the separated oleaginous matter carrying substances other than paper pulp, then beating while hot, floating and separating oleaginous matters and substances other than paper pulp, separating the pulp from the liquor, adding a quantity of soap and ammonia less than that used in the first operation, adding a further quantity of the used paper, and repeating the operations.

In testimony whereof I affix my signature.

ROBERT A. MARR.